United States Patent
Zandbergen et al.

(10) Patent No.: US 10,406,879 B2
(45) Date of Patent: Sep. 10, 2019

(54) VEHICLE WHEEL SUSPENSION

(71) Applicant: Ford Global Technologies, LLC, Dearborn, MI (US)

(72) Inventors: Nicole Zandbergen, Würselen (DE); Rainer Souschek, Aachen (DE); Thomas Gerhards, Niederzier (DE); Ralf Hintzen, Aachen (DE); Daniel Mainz, Herzogenrath (DE); Paul Zandbergen, Würselen (DE); Alberto Girelli Consolaro, Aachen (DE); Friedrich Peter Wolf-Monheim, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 168 days.

(21) Appl. No.: 15/616,384

(22) Filed: Jun. 7, 2017

(65) Prior Publication Data

US 2017/0355240 A1    Dec. 14, 2017

(30) Foreign Application Priority Data

Jun. 8, 2016   (DE) .................. 10 2016 210 072

(51) Int. Cl.
*B60G 7/00*   (2006.01)
*B60G 3/16*   (2006.01)

(52) U.S. Cl.
CPC .............. *B60G 3/16* (2013.01); *B60G 7/001* (2013.01); *B60G 2206/10* (2013.01);
(Continued)

(58) Field of Classification Search
CPC ................ B60G 7/001; B60G 2206/10; B60G 2206/8108
See application file for complete search history.

(56) References Cited

U.S. PATENT DOCUMENTS

| 2,845,134 | A | * | 7/1958 | Reimspiess | .............. | B60G 3/22 |
| | | | | | | 280/124.11 |
| 4,690,426 | A | * | 9/1987 | Kubo | ..................... | B60G 3/202 |
| | | | | | | 280/124.131 |

(Continued)

FOREIGN PATENT DOCUMENTS

| CN | 204020449 U | 12/2014 | | |
| DE | 102010029032 A1 | * 11/2011 | ............... | B60G 3/20 |

(Continued)

OTHER PUBLICATIONS

"Complete Front Upper, Control Arm Upgrade—Left & Right_E39 525i/528i/530i-Meyele HD," Turner Motorsport webpage, Jan. 22, 2016.

*Primary Examiner* — Nicole T Verley
(74) *Attorney, Agent, or Firm* — Raymond L. Coppiellie; Burgess Law Office, PLLC

(57) ABSTRACT

A wheel suspension unit for a motor vehicle having a longitudinal link, having a first end for pivotable vehicle-side connection, a second end for connection to a wheel carrier, and a blade-like link portion resilient in the direction of the transverse axis (Y) and rigid transversely relative thereto. The wheel suspension reduces the number of components by providing a longitudinal link having a resilient portion resilient toward the longitudinal axis (X), wherein the longitudinal link is at least partially produced from a fiber-reinforced plastics material.

10 Claims, 2 Drawing Sheets

(52) U.S. Cl.
CPC .... *B60G 2206/15* (2013.01); *B60G 2206/428* (2013.01); *B60G 2206/7101* (2013.01); *B60G 2206/8108* (2013.01)

(56) References Cited

U.S. PATENT DOCUMENTS

| | | | | |
|---|---|---|---|---|
| 4,696,488 | A * | 9/1987 | Mitobe | B60G 3/22 280/124.131 |
| 4,740,011 | A * | 4/1988 | Mitobe | B60G 3/22 280/124.131 |
| 4,754,992 | A * | 7/1988 | Asanuma | B60G 3/22 280/124.135 |
| 4,989,894 | A * | 2/1991 | Winsor | B60G 3/22 280/124.109 |
| 5,820,150 | A * | 10/1998 | Archer | B60G 3/20 280/124.138 |
| 6,357,772 | B1 * | 3/2002 | Pelz | B60G 3/18 280/124.135 |
| 6,547,268 | B2 * | 4/2003 | Yamamoto | B60G 3/202 280/124.133 |
| 6,571,664 | B2 * | 6/2003 | Tadano | B60G 7/001 280/124.1 |
| 6,808,191 | B1 | 10/2004 | Bahl et al. | |
| 7,014,201 | B2 * | 3/2006 | Lee | B60G 7/001 280/124.128 |
| 7,506,444 | B2 * | 3/2009 | Weise | B60G 7/001 29/557 |
| 8,210,551 | B2 | 7/2012 | Jakob | |
| 8,322,738 | B2 * | 12/2012 | Haas | B60G 7/001 280/124.128 |
| 9,102,211 | B2 | 8/2015 | Darcy | |
| 9,162,546 | B2 * | 10/2015 | Girelli Consolaro | B60G 21/0551 |
| 9,174,505 | B2 * | 11/2015 | Gerrard | B60G 3/20 |
| 9,233,587 | B2 * | 1/2016 | Korte | B21D 53/90 |
| 9,340,082 | B2 | 5/2016 | Hintzen et al. | |
| 9,463,677 | B2 * | 10/2016 | Czerr | B60G 3/202 |
| 9,738,130 | B2 * | 8/2017 | Suzumori | B60G 7/001 |
| 9,776,466 | B2 * | 10/2017 | Battaglia | B60G 3/18 |
| 2006/0151970 | A1 | 7/2006 | Kaminski et al. | |
| 2007/0007741 | A1 | 1/2007 | Jagowsky et al. | |
| 2007/0040345 | A1 * | 2/2007 | Hardtke | B60G 9/02 280/124.164 |
| 2015/0130159 | A1 * | 5/2015 | Nakasato | B60G 3/20 280/124.134 |
| 2017/0253097 | A1 * | 9/2017 | Steiner | B60G 7/001 |
| 2017/0259635 | A1 * | 9/2017 | Jansen | B60G 7/001 |
| 2017/0274716 | A1 * | 9/2017 | Chung | B60G 3/20 |
| 2018/0086377 | A1 * | 3/2018 | Kleemann | B62D 7/18 |
| 2018/0272819 | A1 * | 9/2018 | Galla | F16F 1/38 |
| 2018/0290512 | A1 * | 10/2018 | Hirano | B60G 7/001 |

FOREIGN PATENT DOCUMENTS

| | | | | |
|---|---|---|---|---|
| DE | 102011085145 | A1 * | 4/2013 | ............ B60G 3/28 |
| DE | 102012213664 | A1 * | 2/2014 | ............ B60G 7/001 |
| DE | 102013002342 | A1 * | 8/2014 | ........... B60G 17/019 |
| DE | 102015209001 | A1 * | 11/2016 | ............ B60G 7/001 |
| DE | 102015209002 | A1 * | 11/2016 | ............ B60G 7/001 |
| DE | 102016209691 | A1 * | 12/2017 | ............ B60G 3/12 |
| DE | 102008036342 | B4 * | 7/2018 | |
| EP | 0136563 | B1 | 10/1989 | |
| FR | 2607756 | A1 * | 6/1988 | ............ B60G 3/202 |
| WO | WO2007024919 | A2 | 1/2007 | |
| WO | WO-2007133116 | A1 * | 11/2007 | ............ B60G 7/001 |
| WO | WO-2012139857 | A1 * | 10/2012 | ............ B60G 3/18 |
| WO | WO2014044455 | A1 | 3/2014 | |
| WO | WO2015169948 | A1 | 11/2015 | |
| WO | WO-2017137190 | A1 * | 8/2017 | ............ B60G 11/08 |

\* cited by examiner

VEHICLE WHEEL SUSPENSION

CROSS-REFERENCE TO RELATED APPLICATIONS

Not Applicable

BACKGROUND OF THE INVENTION

1. Field of the Invention

The present invention relates generally to a vehicle wheel suspension; and more specifically, to a longitudinal link having a blade-like link portion resilient in one direction and rigid in a transverse direction.

2. Description of Related Art

A motor vehicle suspension system may include a longitudinal link. The longitudinal link pivotably connected on one end to a vehicle structure; for example, the chassis, an auxiliary frame, or the bodywork. On the other end, it may be connected to a wheel carrier. The wheel carrier may include a carrier plate for the brake caliper of a disc brake. One or more transverse links, and optionally oblique links, may engage or be pivotably connected to the wheel carrier. The longitudinal link securely connects to the vehicle frame and enables a movement of the wheel carrier. Under some circumstances, the wheel carrier is not directly connected to the longitudinal link, but is instead secured to a transverse carrier connecting mutually opposing longitudinal links to each other.

The longitudinal link, wheel carrier and, where applicable, brake carrier plate forms a connected subassembly. These components, produced separately from metal in a production process, are joined together; for example, by welding, pressing, riveting, or other fasteners. Normally, the longitudinal link and the brake carrier plate are produced from sheet steel, while the wheel carrier is formed from sheet metal, welded from a plurality of shaped sheet metal components, or cast.

The longitudinal link is subject to different demands, requiring rigidity in the longitudinal direction to absorb braking and acceleration torque. However, the wheel carrier connected to the longitudinal link is normally suspended with a plurality of lateral connections, for example a transverse link, etc. Therefore, the longitudinal link, if a vertical movement of the wheel in the transverse direction occurs, and regarding the torsion, is not intended to be rigid since a degree of flexibility is required to cancel any over-determination.

One structural form is a blade-like link that normally extends substantially in the X-Z plane. The planar, flattened form is relatively rigid in this plane, while resiliently deformable in the direction of the Y axis. With longitudinal links formed from sheet steel this flexibility can lead to undesirable, undamped oscillations at low frequencies in terms of noise, vibration, harshness (NVH) aspects. The weight of a sheet steel component is undesirably high against the background of the current trend for saving weight and the corresponding fuel consumption reduction.

Rigidity of the longitudinal link in the direction of the longitudinal axis may, however, lead to problems since a degree of longitudinal compensation is sometimes necessary in this direction, for example, wheel deflection or to absorb or damp vibrations introduced by the wheel carrier into the longitudinal link. In addition, for example, when driving over individual obstacles, such as impact bars, a longitudinal flexibility of the wheel suspension is desirable for driving comfort and can be enabled, for example, with a longitudinal link that gives way in the longitudinal direction. Often, resilient bearings are used to connect the longitudinal link to the vehicle structure. Rubber/metal composite bearings having an outer and an inner metal sleeve and a resilient insert arranged therebetween can be used. Such a connection with resilient bearings having an inner and outer sleeve include an outer sleeve is pressed, for example, in an opening of the longitudinal link and a shaft secured to the vehicle structure is guided through the inner sleeve. Where applicable, the resilient insert may also be specially adapted to the inner shape of a portion of the link.

Besides longitudinal links of metal, longitudinal links of composite materials are also known. For example, a vehicle wheel suspension with three transverse links and a resilient longitudinal link rigidly secured to the vehicle structure that acts with a carrier spring. The longitudinal link may comprise in particular composite fiber material. In an embodiment shown, the longitudinal link comprises two components directly secured to the vehicle structure with a securing element, wherein they can be vulcanized with a rubber layer being interposed in the securing element.

The suspension becomes more complex and expensive when using resilient bearings. The resilience of the bearings, produced in all directions, leads to a distortion of the desired resilient behavior of the suspension. Rubber bearings have a negative influence on the primary vertical resilient behavior of a wheel suspension by producing so-called parasitic spring rates. Parasitic spring rates are the proportions of the overall vertical spring rate on the wheel not produced by the primary structural spring.

SUMMARY OF THE INVENTION

A wheel suspension having a longitudinal link formed of a fiber-reinforced material having a first end and a second end. The longitudinal link including a blade-like link portion resilient in a transverse axis and rigid in a longitudinal axis and a resilient portion resilient in said longitudinal axis and rigid in said transverse axis.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
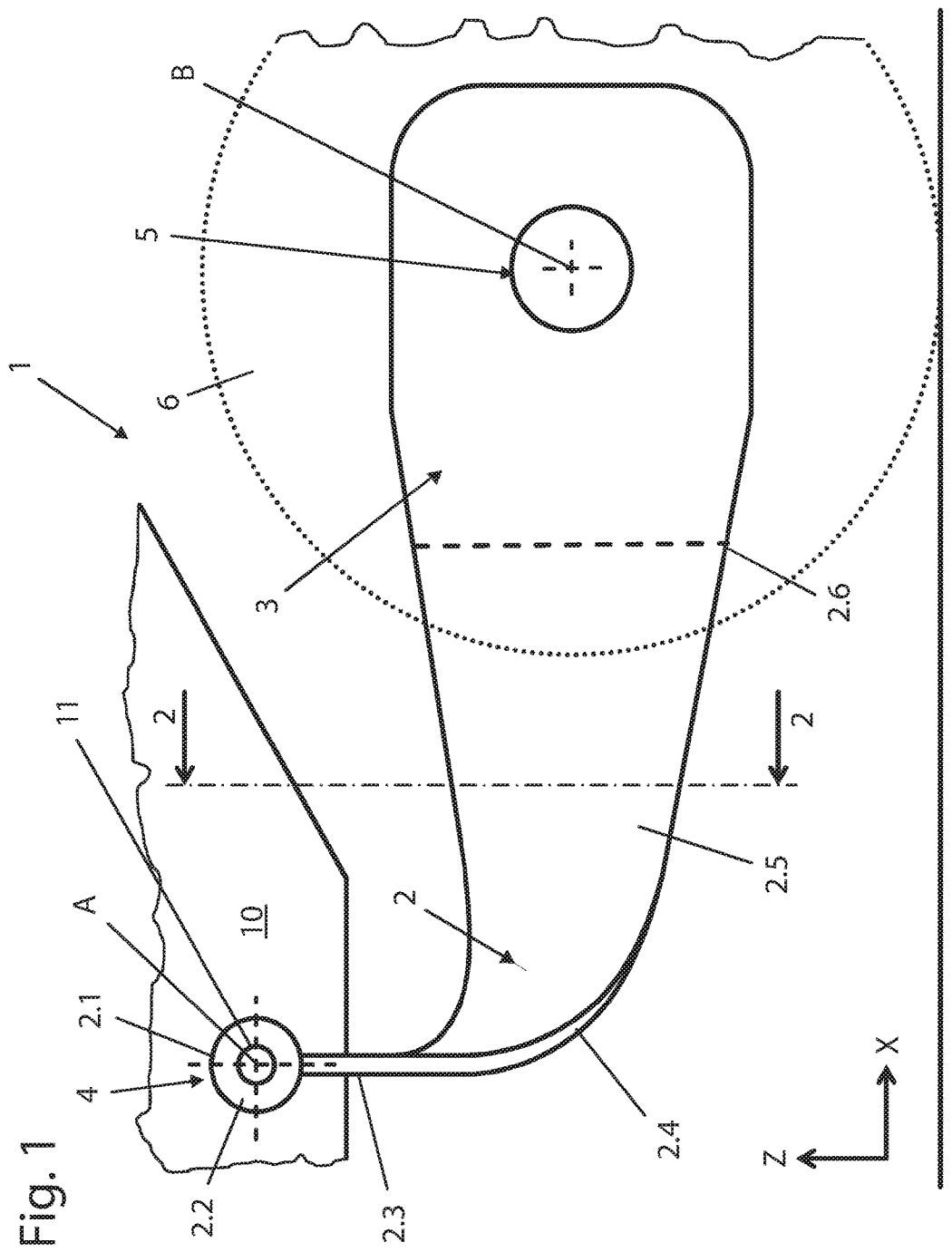
FIG. 1 is a side view of a suspension system according to the invention.

The following description of the preferred embodiment(s) is merely exemplary in nature and is in no way intended to limit the invention, its application, or uses.

In the different Figures, components that are the same are always given the same reference numerals, for which reason they are generally also only described once.

Figure 2:
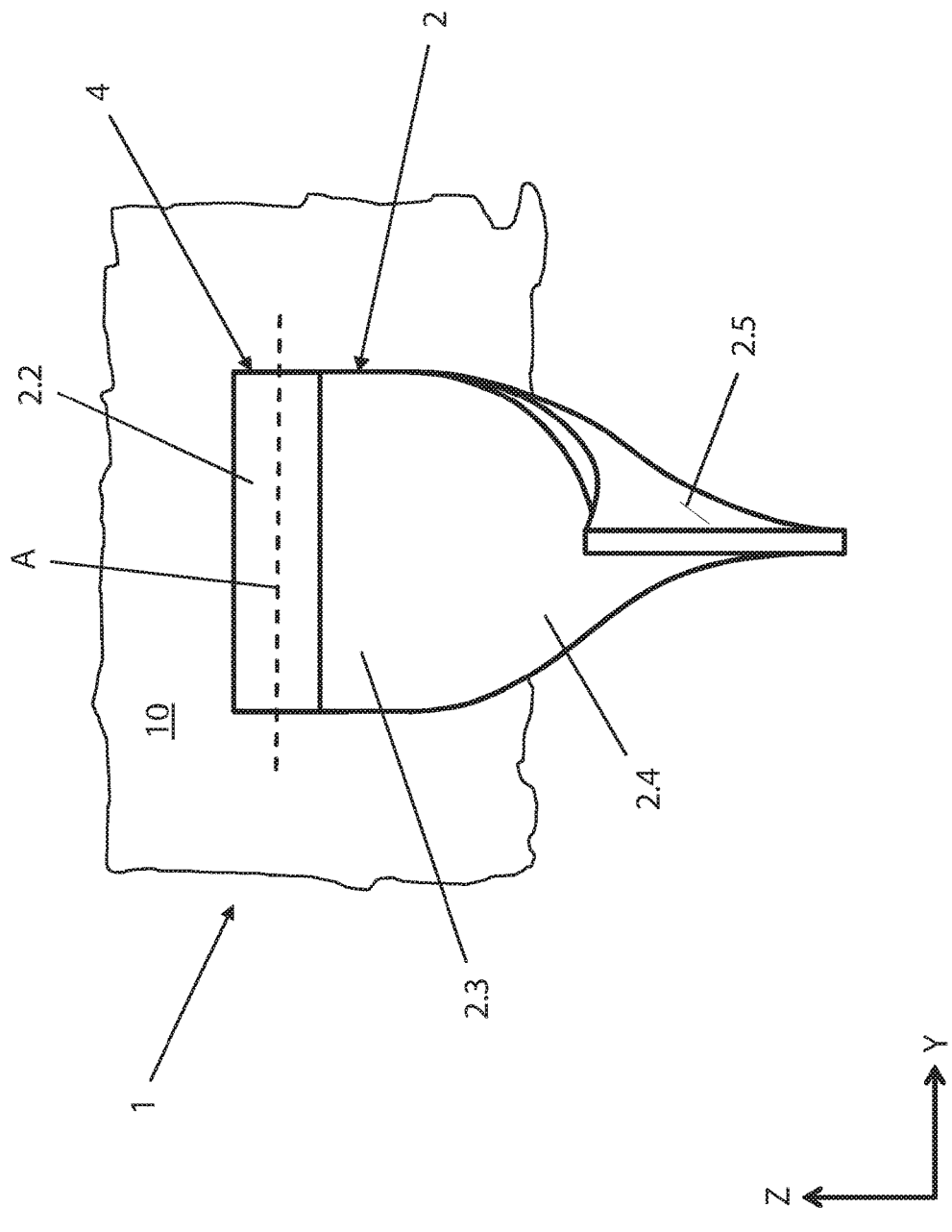
FIG. 2 is a cross-sectional view of the suspension system of FIG. 1 taken along lines 2-2.

FIGS. 1 and 2 illustrate a wheel suspension unit, seen generally at 1, according to an exemplary embodiment of the invention. The wheel suspension unit 1 used, for example, for a passenger vehicle or truck. The suspension unit includes a longitudinal link 2 and a wheel carrier 3 connected thereto. FIGS. 1 and 2 are highly simplified schematic illustrations, and in particular only schematically illustrate the wheel carrier 3. The longitudinal link 2, produced at least primarily from fiber-reinforced plastics material, is pivotably connected at a first end 2.1 to a vehicle structure 10, for example, a longitudinal carrier. The longitudinal link 2 pivots about a pivot axis A extending parallel with the Y axis of the vehicle. At a second end 2.6, the longitudinal link 2 is connected to the wheel carrier 3. The broken line at the second end 2.6 indicates that the longitudinal link 2 and the wheel carrier 3 are prefabricated as separate components and connected to each other in a positive-locking, non-positive-locking and/or materially engaging manner, or preferably, produced integrally in a single original forming step from fiber-reinforced plastics material. Besides the fibers and the plastics material matrix, it is possible for components of a different material, for example, metal or ceramic material to be partially embedded, whereby, for example, the rigidity of the longitudinal link 2 or the wheel carrier 3 can be influenced in a positive manner.

A bearing eye 2.2 of the longitudinal link is connected at the first end 2.1 and forms a link-side portion of a pivot bearing 4. A vehicle-side bearing journal 11 rigidly connected to the vehicle structure 10 engages the bearing eye 2.2. The bearing eye 2.2 adjoined by a downwardly extending resilient portion 2.3 constructed in a planar manner and extending parallel with the Y-Z plane. This is followed by a transition portion 2.4 also constructed in a planar manner and whose plane rotates in a helix-like manner so it extends at an end facing away from the resilient portion 2.3 parallel with the X-Z plane. Here, it merges into a blade-like link portion 2.5 which also extends in the mentioned plane. As seen in FIG. 1, the blade-like link portion 2.5 extends backward in the direction of the X axis.

The wheel carrier 3 receives, in known manner via a rotary bearing 5 illustrated here only schematically, a vehicle wheel 6 rotating about a rotation axis B. The wheel carrier 3 connected to the vehicle structure 10 with additional links, for example, transverse or oblique links, omitted here for reasons of clarity.

The resilient portion 2.3, the transition portion 2.4, and the blade-like link portion 2.5 each comprise fiber-reinforced plastics material constructed in a planar or flat manner, whereby in each case perpendicular to the extent plane of the material a lower level of rigidity is produced than in the transverse direction of the extent plane. The blade-like link portion is comparatively resilient in the direction of the Y axis, while considered non-resilient or rigid in the direction of the X axis and the Z axis. The blade-like link portion 2.5 guides the wheel carrier 3 and insurers rigidity in terms of tracking. In contrast, the resilient portion 2.3 is flexible in the direction of the X axis and substantially rigid in the direction of the Y axis and the Z axis. The resilient portion 2.3 enables to a limited degree a longitudinal compensation in the direction of the X axis between the wheel carrier 3 and the vehicle structure 10. The transition portion 2.4 turned in a helix-like manner ensures a uniform transition between the resilient portion 2.3 and the blade-like link portion 2.5 and generally ensures that tensions within the material are distributed in a uniform manner.

Use of fiber-reinforced plastics material for components of the longitudinal link 2, including the bearing eye 2.2, and the wheel carrier 3 enable integral production in a single original forming step. The production of the wheel suspension unit 1 is consequently simplified, with weight significantly less than a component produced completely from metal. Because of the resilience adjusted by the resilient portion 2.3 in the direction of the X axis, at the pivot bearing 4 a rubber/metal bushing or the like can be dispensed with and the pivot bearing 4 constructed in a non-resilient manner. This again reduces the production costs and ensures that the resilient behavior is not influenced in an undesirable manner by a resilient bearing.

In the exemplary embodiment, the wheel suspension unit 1 is a component of a wheel suspension of a motor vehicle. Motor vehicles include passenger vehicles or trucks. The term "unit" is intended to be understood in functional terms and does not necessarily mean it is on the whole constructed in an integral manner. The wheel suspension unit may comprise a plurality of components that move relative to each other. This aspect is further explained below.

The wheel suspension unit 1 includes at least one longitudinal link 2 having a first end 2.1 for vehicle-side connection, a second end 2.6 connected to a wheel carrier 3 and a blade-like link portion 2.5 resilient in the direction of the transverse axis, illustrated herein as the Y axis of the vehicle, and rigid transversely relative thereto. The longitudinal link 2 extends substantially from the front to the rear in the direction of the longitudinal or X axis, wherein it does not, however, have to extend continuously parallel with the longitudinal axis. The blade-like link portion is arranged between the first and second end.

A vehicle-side connection is understood to be a connection to a chassis, a bodywork, a self-supporting bodywork, an auxiliary frame or the like of the vehicle. The first end 2.1 is provided for pivotable connection at the vehicle side. The first end 2.1 may have a bearing bush in which a bearing journal or an axle provided at the side of the vehicle engages. The pivotable connection enables a pivot movement about the transverse axis or Y axis of the vehicle.

The second end 2.6 connects to a wheel carrier 3. This includes the possibility of the longitudinal link 2 physically connected through fasting means or other joint or connection mechanism to a wheel carrier 3 the other links. The wheel carrier 3 being a component receiving the actual rotation axle of the wheel. If the longitudinal link 2 can be connected to the wheel carrier, there may be provided at the second end 2.6, for example, holes used for screwing or riveting to the wheel carrier 3.

The blade-like link portion 2.5 is resilient in the direction of the transverse or Y axis and rigid transversely relative thereto, intended to be understood in such a manner that the rigidity in the direction of the transverse axis or Y axis is significantly lower than in the direction of the vertical axis or Z axis and/or the longitudinal axis or X axis. The term "rigid" is understood to mean that during normal operation of the vehicle at most a slight deformation, for example, in the range of a few millimeters or below occurs. The blade-like link portion 2.5 functions similar to a blade-like link. For example, it allows the wheel carrier 3 with the wheel arranged thereon because of its resilience a degree of movement in the direction of the transverse axis, whilst a movement in the direction of the vertical axis is allowed substantially only by the pivotable connection to the first end.

Typically, the blade-like link portion 2.5, because of the rigidity thereof, allows no deformation in the direction of the longitudinal axis and consequently no movement of the wheel carrier.

The longitudinal link 2 has a resilient portion 2.3 resilient in the direction of the longitudinal axis. The term "resilient" is considered in particular in relation to the above-mentioned rigidity or resilience of the blade-like link portion 2.5. Because of the resilient deformability of the resilient portion 2.3 in the direction of the X axis, the longitudinal link 2 can enable a degree a movement of the wheel carrier 3 in this direction relative to the vehicle structure 10. The resilient portion 2.3 is arranged between the first and second ends 2.1, 2.6. Where the resilient portion 2.3 and the blade-like link portion 2.5 are different regions of the longitudinal link 2, the actual function of the blade-like link portion 2.5 is not impaired. The resilient portion 2.3 may be optimized substantially independently of it providing resilience in the longitudinal direction. The resilience may, on the one hand, be adjusted by the selection of the material or the inner structure thereof and the shape and the path of the resilient portion 2.3. The longitudinal link 2 of the exemplary embodiment, because of the structure thereof, carries out a necessary longitudinal compensation between the vehicle structure 10 and the wheel carrier 3. Such a longitudinal compensation may, on the one hand, be necessary during the deflection because of the movement of the wheel carrier 3, normally guided with additional links, in particular transverse or oblique links. The wheel carrier 3 can be displaced in the longitudinal direction regarding the vehicle structure 10 during braking or acceleration. It is possible for vibrations to occur at the side of the wheel 6 or wheel carrier 3 in the direction of the longitudinal axis preferably not transmitted to the vehicle structure 10. The resilient deformability of the resilient portion 2.3 substantially damps these vibrations. In addition, in this manner, for example, when individual obstacles are driven over, such as, for example, impact bars, a longitudinal flexibility of the wheel suspension can be produced by the resilient portion 2.3 of the longitudinal link 2 that gives way in the longitudinal direction. The structure of the suspension is simplified and the production costs can be reduced. The resilience of the resilient portion 2.3 can be configured in a manner wherein, in contrast to rubber/metal composite bearings, an undesirable influence of the resilient behavior can be prevented.

The longitudinal link 2 is produced at least partially from a fiber-reinforced plastics material. This includes using a plurality of different plastics materials and/or different fibers including placing different fibers one over the other in different layers. For example, the fiber-reinforced plastics material may comprise carbon fibers, glass fibers and/or aramid fibers. In addition, however, other fibers may also be used. Fibers of different types may be used in a mixed state or in different layers one above the other. In principle, the fibers may be woven or non-woven, orientated or not orientated. Preferably, the fibers are orientated in such a manner that, because of their orientation, the rigidity of the longitudinal link is influenced in a selective manner.

Partial replacement of metal, as a material for the longitudinal link with fiber-reinforced plastics material, provides two advantages. Initially the longitudinal link 2 achieves a comparable stability with lower weight. The overall weight of the vehicle and consequently the fuel consumption and the $CO_2$ emissions are reduced. An additional advantage is that steel or other metals are per se isotropic, a small volume element of the metal reacts in the same manner with respect to tensile forces, pressure forces, etc., regardless of the direction thereof. Therefore, a different rigidity of a metal component with respect to different directions can be produced only by the shaping. In contrast with a fiber-reinforced plastics material, because of the orientation of the fibers, specific directions in which increased rigidity is produced can be predetermined. The component normally has, in relation to forces which act in the extent direction of the fibers, an increased rigidity. The rigidity may also be influenced by the packing density and/or the material of the fibers and the plastics material itself, the fiber and matrix or resin. It is also possible, depending on location, to use different densities, orientations and/or materials for the fibers. In contrast to a metal component, the fiber-reinforced plastics material may be non-homogeneous.

The vibration behavior of the component is at least partially linked to the rigidity. This can also be influenced in a selective manner by the orientation, density and/or material of the fibers and by the material of the plastics material. Consequently, specific vibrations, undesirable in terms of NVH considerations, can be substantially eliminated because locally different properties of the fibers make propagation of vibrations within the component more difficult. This property may also contribute to making a rubber/metal composite bearing for vehicle-side connection superfluous.

In addition, the production process of the longitudinal link 2 is simplified depending on the shape, a fiber-reinforced plastics material can be formed into almost any shape. A longitudinal link formed from sheet steel, requires carrying out a production operation in several steps which include, for example, punching and deep-drawing or the like. Specific shapes are not possible or can be produced only with considerable difficulties. The deformation processes with a steel component may also locally weaken the structure of the metal at a particular location causing premature material fatigue. A plastic material component does not have this problem. The production installations required to produce a fiber-reinforced plastics material component are more simple and cost-effective than those producing shaped sheet metal components.

Besides the influence on the properties by the composition and orientation of the fibers and the selection of the plastics material, it is possible for at least one component of a different material to be embedded in the fiber-reinforced plastics material. The term "embedded" is understood to mean that the component mentioned is at least partially surrounded by fiber-reinforced plastics material, where applicable, portions of the component may be on the surface. The term "component" is to be understood in the sense of a portion, part or element. It is also possible to refer to an insertion component. For example, such a component may comprise metal, ceramic material, rubber or an additional plastics material, differing from the material of the matrix of the fiber-reinforced plastics material. Such components, in particular of metal or ceramic material, in regions of the longitudinal link can be locally reinforced, producing an improved strength or rigidity. It is again possible for the propagation of vibrations inside the component to be suppressed. It is possible to refer to a hybrid construction of the longitudinal link. This embodiment also includes constructions in which, for example, there is formed a bearing sleeve of metal already embedded in the fiber-reinforced plastics material during the production process. Metals include steel or light metals, such as aluminum. It is also possible to vulcanize a component of rubber, for example, a bearing bush, if one is used, after or during the shaping operation of the fiber-reinforced plastics material.

It is in particular possible with a longitudinal link 2 of fiber-reinforced plastics material to adapt the shape thereof during the production process in almost any manner desired. For example, providing recesses for saving weight or reinforcement ribs. Such a recess may in principle be a hollow space within the longitudinal link 2. It may be a recess in the surface of the longitudinal link or a continuous opening. Besides a weight saving, such recesses may have an advantageous effect on the oscillation behavior of the longitudinal link 2. A reinforcement rib protrudes with respect to the surrounding surface of the longitudinal link 2 or protrudes therefrom. One or more reinforcement ribs may flank a recess. It is possible to achieve a higher level of stability with respect to a structure without a reinforcement rib and recess with the same weight. An appropriate use of reinforcement ribs can also again have a positive influence on the vibration behavior of the longitudinal link 2.

The resilient portion is constructed to be rigid transversely relative to the longitudinal axis. This means, that during normal operation of the vehicle in the direction of the transverse axis and/or the vertical axis of the vehicle there is no or at most only a slight deformation of the resilient portion. Such a construction stabilizes the longitudinal link 2 and separates the resilient portion 2.3 and the blade-like link portion 2.5, resilient in the direction of the transverse axis. A resilience of the resilient portion 2.3 both in the direction of the longitudinal axis and transversely relative thereto could under some circumstances lead to the connection of the wheel carrier 3 with respect to the vehicle generally becoming too soft and the longitudinal link 2 no longer guiding the wheel carrier 3 in an adequate manner. A resilience in the direction of the vertical axis may also influence the resilient behavior of the entire suspension in an undesirable manner.

Preferably, the resilient portion 2.3 is arranged adjacent to the first end 2.1. The resilient portion 2.3 forms the portion of the longitudinal link 2 adjacent the vehicle structure 10, while the blade-like link portion 2.5 is spaced further apart from the first end 2.1 and consequently from the connection location at the vehicle structure 10. This arrangement may be advantageous where the resilient portion 2.3 can partially perform the function of a rubber/metal bearing at the first end 2.1. The construction and function of the blade-like link portion 2.5 can consequently be similar to that of a blade-like link portion known in the prior art and requires under some circumstances no more significant adaptation.

Preferably, the resilient portion 2.3 may extend downward. The resilient portion 2.3 extends in the direction of the vertical axis or Z axis of the vehicle, wherein the first end 211 for vehicle-side connection is typically arranged at the upper end thereof. Since the blade-like link portion 2.5 extends substantially in a backward direction, in the direction of the X axis, the longitudinal link has in this embodiment a substantially L-shaped or bent structure. That the resilient portion 2.3 extends downward includes the possibility it extends parallel with the Z axis. However, it may also, for example, extend at an angle relative thereto, for example, 30° or 45°. Such an angle may also change partially inside the resilient portion 2.3. With a resilient portion that extends downward, a force acts in the direction of the X axis at least proportionately transversely relative to the extent direction thereof, which promotes a resilience in the direction of the X axis.

Both with regard to the production and the required resilience, the resilient portion 2.3 in be constructed in a planar manner and to extend parallel with the transverse axis, wherein the blade-like link portion 2.5 is also constructed in a planar manner but extends parallel with the vertical axis. In particular, the resilient portion 2.3 may extend within the Y-Z plane. The blade-like link portion 2.5 may extend within the X-Z plane. The term "planar" means the corresponding portion in a direction, perpendicular relative to the face, has substantially smaller dimensions than in the directions transversely relative thereto. It may, for example, be constructed in a plate-like or strip-like manner. Such planar structures can be readily formed both from a steel sheet and from a fiber-reinforced plastics material. A planar portion may but does not necessarily have to be constructed in a flat manner.

A transition portion 2.4 is constructed between the resilient portion 2.3 and the blade-like link portion 2.5. In particular, this may be a planar transition portion 2.4 turned in a helix-like manner and extending adjacent to the resilient portion 2.3 parallel with the transverse axis and extending adjacent to the blade-like link portion 2.5 parallel with the vertical axis. The transition portion 2.4 may merge steplessly into the two adjacent portions 2.3, 2.5, the transition is seamless with no identifiable boundary. Beginning with the resilient portion 2.3, the transition portion 2.4 first extends parallel with the transverse axis, which corresponds to the path of the resilient portion 2.3. If successive small part-pieces of the transition portion 2.4 are now considered, the extent direction thereof now turns from parallelism with respect to the transverse axis as far as parallelism with respect to the vertical axis. In the region, adjacent to the blade-like link portion 2.5 extending parallel with the vertical axis, the transition portion 2.4 also extends accordingly. The outer edges of the transition portion may extend in a helical line-like manner. The precise path may become more complex in that the resilient portion 2.3 extends downward while the blade-like link portion 2.5 extends substantially horizontally, wherein the transition portion 2.4 may form a type of knee or bend in the transition from the perpendicular to the horizontal extent. The resilient portion 2.3, transition portion 2.4, and blade-like link portion 2.5 may be components of a planar member optionally with constant thickness, for example a layer thickness, that only changes its path. The transition portion 2.4 generally provides a relatively gentle transition from the blade-like link portion 2.5 to the resilient portion 2.3 that generally ensures distribution in a relatively uniform manner of occurring tensions. With a longitudinal link 2 of fiber-reinforced material, the fibers may follow the respective path of the portions. It is also conceivable, for example, for the transition portion 2.4 to be reinforced in a selective manner by embedding elements of metal, ceramic material or other materials.

The resilience of the resilient portion 2.3 in the longitudinal direction dispenses with a conventional connection using resilient bearings. Therefore, the longitudinal link 2 preferably has at the first end 2.1 a non-resilient bearing for vehicle-side connection. A normal rotary bearing, for example, a sleeve, in which a vehicle-side 10 shaft acts as a rotation axis or bearing journal is used. In the assembled state, the longitudinal link 2 is consequently connected at the first end 2.1 at the vehicle side by a non-resilient bearing.

The non-resilient bearing may be prefabricated as a separate component and secured to the resilient portion 2.3. This generally leads to additional connection elements being required, which may, where applicable, have a disadvantageous effect on the stability and furthermore lead to additional weight. In one embodiment, a non-resilient bearing is therefore at least partially formed integrally with the resilient portion 2.3. If a longitudinal link 2 comprises fiber-reinforced plastics material, it can be formed directly during the original forming process with the resilient portion 2.3. The link-side portion of the bearing may be a type of eye or sleeve. If desired, there could also be embedded in the innermost region a metal sleeve placed before the original forming operation is begun. Such a metal sleeve could then be surrounded at the outer side by a cover of fiber-reinforced plastics material, via which the connection to the resilient portion is produced.

While possible to produce the longitudinal link 2 and wheel carrier 3 as separate components and connect them to each other using known connection methods, such as screwing or riveting, it is preferable for the wheel carrier 3 to be constructed integrally with the longitudinal link 2, wherein the longitudinal link 2 merges at the second end 2.6 into the wheel carrier 3. The longitudinal link 2 connects at the second end 2.6 in an integral manner to the wheel carrier 3. No material separation occurs between the wheel carrier 3 and longitudinal link 2, instead they are produced directly during the production as a single component. As long as the longitudinal link 2, at least partially or primarily, includes fiber-reinforced plastics material, this also applies to the entire component.

An advantage is both pieces need not be assembled, eliminating considering production tolerances in the connection region, whereby operating steps relating to assembly and connection of the longitudinal link and wheel carrier can be dispensed with. Leading to cost savings and simplifying quality control. Also, the additional weight of connection components, such as screws, rivets or weld seams can be saved. Regarding the wheel carrier, the exemplary embodiment saves weight over wheel carriers cast or constructed as sheet metal components. The partially complex and cost-intensive production steps of a separate wheel carrier, for example, of sheet metal, are dispensed with, whereby the efficiency of the production process is further increased. The packing density, orientation and/or composition of the embedded fibers, and the material properties of the wheel carrier can be adjusted substantially independently of those of the longitudinal link.

It is optionally also possible to embed components of other materials in the wheel carrier. This may relate to the region which receives the actual axle of the respective wheel. At this location, for example, it is possible to embed a sleeve of metal, a bearing bush of rubber or a similar metal member directly in the matrix of the fiber-reinforced plastics material.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A wheel suspension unit for a motor vehicle comprising:
   a longitudinal link having a first end for pivotable vehicle-side connection, a second end for connection to a wheel carrier, and a blade-like link portion resilient in a direction of a transverse axis and rigid transversely relative thereto; and
   said longitudinal link has a resilient portion resilient in a direction of a longitudinal axis, wherein the longitudinal link is at least partially produced from a fiber-reinforced plastics material wherein said resilient portion is constructed in a planar manner and extends parallel with a Y-Z axis plane and said blade-like link portion is constructed in a planar manner and extends parallel with a X-Z axis plane.

2. The wheel suspension unit of claim 1 wherein between said resilient portion and said blade-like link portion there is formed a planar transition portion turned in a helix-like manner and extending adjacent to said resilient portion and parallel with said Y-Z axis plane and extends adjacent to the blade-like link portion parallel with said X-Z axis plane.

3. The wheel suspension unit of claim 1 wherein said longitudinal link has at said first end a non-resilient bearing for vehicle-side connection.

4. The wheel suspension unit of claim 3 wherein the non-resilient bearing is at least partially formed integrally with said resilient portion.

5. The wheel suspension unit of claim 1 wherein a wheel carrier is constructed integrally with said longitudinal link and said longitudinal link merges at the second end into said wheel carrier.

6. A wheel suspension comprising:
   a longitudinal link formed of a fiber-reinforced material having a first end and a second end; and
   said longitudinal link including a blade-like link portion resilient in a transverse axis and rigid in a longitudinal axis and a resilient portion resilient in said longitudinal axis and rigid in said transverse axis wherein the resilient portion is substantially planar and extends parallel with a transverse and vertical axis plane and the blade-like link portion is substantially planar and extends parallel with a longitudinal and vertical axis plane.

7. The wheel suspension of claim 6 including said resilient portion arranged adjacent to said first end and said blade-like portion arranged adjacent to a second end, said second end adjacent a wheel carrier.

8. The wheel suspension of claim 6 including a planar transition portion curved in a helix and extending between the resilient portion and the blade-like link portion.

9. The wheel suspension of claim 6 including a wheel carrier forming an integral portion of the longitudinal link adjacent said second end.

10. A wheel suspension comprising:
    a longitudinal link formed of a fiber-reinforced material having a first end and a second end;
    said longitudinal link including a blade-like link portion resilient in a transverse axis and rigid in a longitudinal axis and a resilient portion resilient in said longitudinal axis and rigid in said transverse axis;
    a planar transition portion curved in a helix and extending between the resilient portion and the blade-like link portion;
    a non-resilient bearing integrally connected to said resilient portion at said first end; and
    a wheel carrier integrally connected to said blade-like portion at said second end.

* * * * *